(12) United States Patent
Somers (10) Patent No.: US 6,607,164 B2
(45) Date of Patent: Aug. 19, 2003

(54) WING AIRFOIL

(75) Inventor: Dan M. Somers, Port Matilda, PA (US)

(73) Assignee: Toyota Motor Sales, U.S.A., Inc., Torrance, CA (US)

(*) Notice: Subject to any disclaimer, the term of this patent is extended or adjusted under 35 U.S.C. 154(b) by 0 days.

(21) Appl. No.: 09/982,972

(22) Filed: Oct. 22, 2001

(65) Prior Publication Data

US 2003/0127561 A1 Jul. 10, 2003

(51) Int. Cl.[7] ............................................. B64C 3/14
(52) U.S. Cl. ................................................... 244/35 R
(58) Field of Search ........................... 244/35 R, 34 R, 244/123, 35 A; 416/242, 223 R (56) References Cited

U.S. PATENT DOCUMENTS

| | | | |
|---|---|---|---|
| 1,802,283 A | * | 4/1931 | Simmonds |
| 4,240,598 A | | 12/1980 | Vinas Espin et al. |
| 4,412,664 A | | 11/1983 | Noonan |
| 4,416,434 A | | 11/1983 | Thibert et al. |
| 4,459,083 A | | 7/1984 | Bingham |
| 4,524,928 A | * | 6/1985 | Schmidt et al. |
| 4,606,519 A | | 8/1986 | Fertis et al. |
| 4,619,423 A | | 10/1986 | Holmes et al. |
| 4,630,787 A | | 12/1986 | Middlebrook |
| 4,652,213 A | | 3/1987 | Thibert et al. |
| 4,668,169 A | | 5/1987 | Perry |
| 4,718,619 A | * | 1/1988 | Ashill et al. |
| 4,732,542 A | | 3/1988 | Hahn et al. |
| 4,776,531 A | * | 10/1988 | Noonan |
| 4,830,315 A | | 5/1989 | Presz, Jr. et al. |
| 4,830,574 A | | 5/1989 | Wainauski et al. |
| 4,941,803 A | | 7/1990 | Wainauski et al. |
| 5,114,099 A | | 5/1992 | Gao |
| 5,209,643 A | | 5/1993 | Cole |
| 5,344,102 A | * | 9/1994 | Nakadate et al. |
| 5,395,071 A | * | 3/1995 | Felix |
| 5,417,548 A | | 5/1995 | Tangler et al. |
| 5,562,420 A | | 10/1996 | Tangler et al. |
| 6,068,219 A | | 5/2000 | Arata |
| 6,068,446 A | | 5/2000 | Tangler et al. |
| 6,089,502 A | | 7/2000 | Herrick et al. |
| 6,095,457 A | | 8/2000 | Vanmoor |
| 6,149,101 A | | 11/2000 | Tracy |
| 6,186,445 B1 | | 2/2001 | Batcho |

FOREIGN PATENT DOCUMENTS

EP        0 068 121 A1        5/1982

OTHER PUBLICATIONS

Aerodynamics, Aeronautics, and Flight Mechanics. McCormick, Barnes. 1979. p. 63–93.*

J. L. Stollery and D.J. Dyer, "Wing–Section Effects on the Flight Performance of a Remotely Piloted Vehicle," 452 Journal of Aircraft 26 (Oct. 1989), No. 10, Washington, D.C.

Somers, Dan M., "Design and Experimental Results for a Natural–Laminar–Flow Airfoil for General Aviation Applications," NASA Technical Paper 1861, Jun. 18, 1981,.

Somers, Dan M., "Subsonic Natural–Laminar–Flow Airfoils," Natural Laminar Flow Control, R.W. Barnwell and M.Y. Hussaini, eds., Springer–Verlag New York, Inc., (1992) pp. 143–176.

Selig, Michael S, Maughmer, Mark D., and Somers, Dan M., "Natural–Laminar–Flow Airfoil for General–Aviation Applications," J. Aircr., vol. 32, No. 4, Jul.–Aug. 1995, pp. 710–715.

Somers, Dan M., "Design and Experimental Results for a Flapped Natural–Laminar–Flow Airfoil for General Aviation Applications," NASA TP–1865, Jun. 1981.

* cited by examiner

Primary Examiner—Tien Dinh
(74) Attorney, Agent, or Firm—Finnegan, Henderson, Farabow, Garrett & Dunner, LLP (57) ABSTRACT

An airfoil having particular use in a general aviation aircraft operating at generally low speeds. The airfoil has a shape designed to produce high lift coefficients at low speeds, with low drag and lower lift coefficients at higher speeds. The airfoil's lift characteristics are not sensitive to surface roughness on the leading edge caused by the accumulation of foreign matter on the airfoil due to the transition to turbulent flow occurring near the leading edge at high lift coefficients.

22 Claims, 9 Drawing Sheets

DISTANCE ALONG AIRFOIL CHORD $\alpha = 5°, 6°, 7°$

FIG. 7

DISTANCE ALONG AIRFOIL CHORD

DISTANCE ALONG AIRFOIL CHORD

WING AIRFOIL

BACKGROUND OF THE INVENTION

This invention generally relates to airfoils.

The invention finds particular utility as an airfoil for use in the main wing of relatively low-speed, general aviation aircraft. A conventional aircraft configuration typically includes two wings connected to a fuselage. Aircraft must operate at a range of speeds and require different wing lift and drag characteristics for different speeds. High lift coefficients are required at lower speeds, as, for example at landing and takeoff. Low drag and lower lift coefficients are desirable for optimum performance at higher speeds. In addition, it is desirable that the airfoil's lift characteristics not be sensitive to surface roughness caused by the accumulation of foreign matter on the leading edge of the airfoil. Moreover, it is also desirable to have the airfoil exhibit relatively docile stall characteristics. Such characteristics are determined by the shape of the airfoil, which in turn determines the aerodynamic forces exerted on the airfoil as it passes through the air at various speeds and orientations.

For purposes of three-dimensional, aerodynamic efficiency, the chord of an airfoil, or cross-section of a wing, will typically be larger at the root of the span of the wing and will typically become smaller at the tip of the wing. Therefore, a table of coordinates for the geometry of the upper and lower surfaces of an airfoil can remain valid from the root to the tip of the wing, since the coordinates are dimensionless and are provided as percentages of the chord of the airfoil.

Another important parameter for every airfoil or wing cross-section is its operating Reynolds number. The Reynolds number of an airfoil (at a particular span station) is dimensionless and is defined by the following equation: $R=cV/\nu$, where $R$ is the Reynolds number, $c$ is the chord of the airfoil, $V$ is the free-stream flow velocity, and $\nu$ is the kinematic viscosity of the air. Physically, the Reynolds number can be thought of as the ratio of the inertial forces to the viscous forces of air flow over a wing.

Airfoil performance characteristics are a function of the airfoil's Reynolds number. As the velocity of air over a wing and/or the chord length of a wing decrease, the wing's Reynolds number decreases. A small Reynolds number indicates that viscous forces predominate while a large Reynolds number indicates that inertial forces predominate.

Another parameter used to describe the aerodynamic performance of an airfoil is its lift characteristics. Normally, the lift of an airfoil or wing is expressed as a lift coefficient, a dimensionless number that measures how effectively a wing converts the dynamic pressure of the flow into a useful lift force. The lift characteristics of an airfoil change significantly as the angle between the airfoil and the apparent wind change. That angle is known as the angle of attack.

Numerous aircraft airfoil designs have been used in general aviation aircraft. Many conventional-aircraft airfoil designs produce diminished lift coefficients if the wings accumulate materials (e.g., insects, dirt or rain) on the airfoil surfaces, especially the leading edge. Such roughness is of concern because the performance characteristics of the aircraft are variable depending on the smoothness of the airfoil surfaces. A number of ways to reduce the sensitivity of aircraft wings to the effects of surface roughness have been devised. One is to induce turbulent flow on the upper surface of the airfoil so that the accumulation of material on the airfoil will not significantly alter air flow or the lift characteristics of the wing. One such technique is disclosed in U.S. Pat. No. 6,068,446 with respect to airfoils for wind turbines.

Thus, one objective of the present invention is to produce an airfoil useful for the main wing of a general aviation aircraft where the airfoil's maximum lift coefficient has minimal sensitivity to leading edge roughness effects. The primary goal of the invention is to provide an airfoil that efficiently converts the forward velocity of the aircraft into a lift sustaining force. Another object of the invention is to provide an airfoil having a high maximum lift coefficient and low drag. Still another object of the invention is to provide an airfoil having docile stall behavior.

SUMMARY OF THE INVENTION

To achieve these and other goals for the present invention there is provided an airfoil shape for the main wing of a general aviation aircraft. In a first embodiment the airfoil has a blunt trailing edge. The airfoil has an upper surface, a lower surface, and a chord line. In such an airfoil, x/c values are dimensionless locations on the chord line and the corresponding y/c values are dimensionless distances from the chord line to points on the upper or lower surface. The values correspond substantially to the following table for the surfaces in the embodiment having a blunt trailing edge:

| Upper Surface | | Lower Surface | |
|---|---|---|---|
| x/c | y/c | x/c | y/c |
| 0.00001 | 0.00039 | 0.00009 | −0.00147 |
| 0.00017 | 0.00217 | 0.00054 | −0.00308 |
| 0.00357 | 0.01122 | 0.00151 | −0.00454 |
| 0.01117 | 0.02128 | 0.00300 | −0.00600 |
| 0.02281 | 0.03160 | 0.01018 | −0.01065 |
| 0.03845 | 0.04166 | 0.02452 | −0.01660 |
| 0.05803 | 0.05091 | 0.04424 | −0.02243 |
| 0.08181 | 0.05887 | 0.06896 | −0.02811 |
| 0.11019 | 0.06562 | 0.09830 | −0.03357 |
| 0.14297 | 0.07163 | 0.13180 | −0.03876 |
| 0.17954 | 0.07704 | 0.16902 | −0.04357 |
| 0.21937 | 0.08178 | 0.20943 | −0.04791 |
| 0.26191 | 0.08578 | 0.25250 | −0.05166 |
| 0.30662 | 0.08892 | 0.29769 | −0.05467 |
| 0.35296 | 0.09109 | 0.34441 | −0.05678 |
| 0.40037 | 0.09215 | 0.39208 | −0.05776 |
| 0.44828 | 0.09194 | 0.44011 | −0.05736 |
| 0.49614 | 0.09013 | 0.48787 | −0.05495 |
| 0.54379 | 0.08620 | 0.53570 | −0.04955 |
| 0.59159 | 0.08025 | 0.58486 | −0.04152 |
| 0.63946 | 0.07299 | 0.63544 | −0.03252 |
| 0.68678 | 0.06502 | 0.68645 | −0.02371 |
| 0.73290 | 0.05672 | 0.73682 | −0.01572 |
| 0.77715 | 0.04842 | 0.78548 | −0.00900 |
| 0.81885 | 0.04036 | 0.83135 | −0.00377 |
| 0.85732 | 0.03272 | 0.87343 | −0.00018 |
| 0.89191 | 0.02553 | 0.91073 | 0.00180 |
| 0.92409 | 0.01864 | 0.94228 | 0.00238 |
| 0.95097 | 0.01279 | 0.96734 | 0.00199 |
| 0.97222 | 0.00812 | 0.98544 | 0.00115 |
| 0.98759 | 0.00474 | 0.99636 | 0.00034 |
| 0.99689 | 0.00269 | 1.00000 | 0.00000 |
| 1.00000 | 0.00200 | | |

A second embodiment of the invention is an airfoil shape for the main wing of a general aviation aircraft having a sharp trailing edge. The airfoil has an upper surface, a lower surface, and a chord line. In such an airfoil, x/c values are dimensionless location the chord line and the corresponding y/c values are dimensionless distances from the chord line to points on the upper or lower surface. The values correspond substantially to the following table for the surfaces in the embodiment having a sharp trailing edge:

| Upper Surface | | Lower Surface | |
|---|---|---|---|
| x/c | y/c | x/c | y/c |
| 0.00001 | 0.00039 | 0.00009 | −0.00147 |
| 0.00017 | 0.00217 | 0.00054 | −0.00308 |
| 0.00357 | 0.01122 | 0.00151 | −0.00454 |
| 0.01117 | 0.02128 | 0.00300 | −0.00600 |
| 0.02281 | 0.03160 | 0.01018 | −0.01065 |
| 0.03845 | 0.04166 | 0.02452 | −0.01660 |
| 0.05803 | 0.05091 | 0.04424 | −0.02243 |
| 0.08181 | 0.05887 | 0.06896 | −0.02811 |
| 0.11019 | 0.06562 | 0.09830 | −0.03357 |
| 0.14297 | 0.07163 | 0.13180 | −0.03876 |
| 0.17954 | 0.07704 | 0.16902 | −0.04357 |
| 0.21937 | 0.08178 | 0.20943 | −0.04791 |
| 0.26191 | 0.08578 | 0.25250 | −0.05166 |
| 0.30662 | 0.08892 | 0.29769 | −0.05467 |
| 0.35296 | 0.09109 | 0.34441 | −0.05678 |
| 0.40037 | 0.09215 | 0.39208 | −0.05776 |
| 0.44828 | 0.09194 | 0.44011 | −0.05736 |
| 0.49614 | 0.09013 | 0.48787 | −0.05495 |
| 0.54379 | 0.08620 | 0.53570 | −0.04955 |
| 0.59159 | 0.08025 | 0.58486 | −0.04152 |
| 0.63946 | 0.07299 | 0.63544 | −0.03252 |
| 0.68678 | 0.06502 | 0.68645 | −0.02371 |
| 0.73290 | 0.05672 | 0.73682 | −0.01572 |
| 0.77715 | 0.04842 | 0.78548 | −0.00900 |
| 0.81885 | 0.04036 | 0.83135 | −0.00377 |
| 0.85732 | 0.03272 | 0.87343 | −0.00018 |
| 0.89191 | 0.02553 | 0.91073 | 0.00180 |
| 0.92221 | 0.01865 | 0.94228 | 0.00238 |
| 0.94818 | 0.01220 | 0.96734 | 0.00199 |
| 0.96965 | 0.00672 | 0.98544 | 0.00115 |
| 0.98603 | 0.00278 | 0.99636 | 0.00034 |
| 0.99642 | 0.00062 | 1.00000 | 0.00000 |
| 1.00000 | 0.00000 | | |

The airfoil shapes of the present invention are specifically designed for the wing of a general aviation aircraft, although the invention may also have utility in other applications.

BRIEF DESCRIPTION OF THE DRAWINGS

The accompanying drawings, which are incorporated in and constitute a part of this specification, illustrate several embodiments of the invention and, together with the following description, serve to explain the principles of the invention. In the drawings.

DETAILED DESCRIPTION OF THE PREFERRED EMBODIMENT

Figure 1:
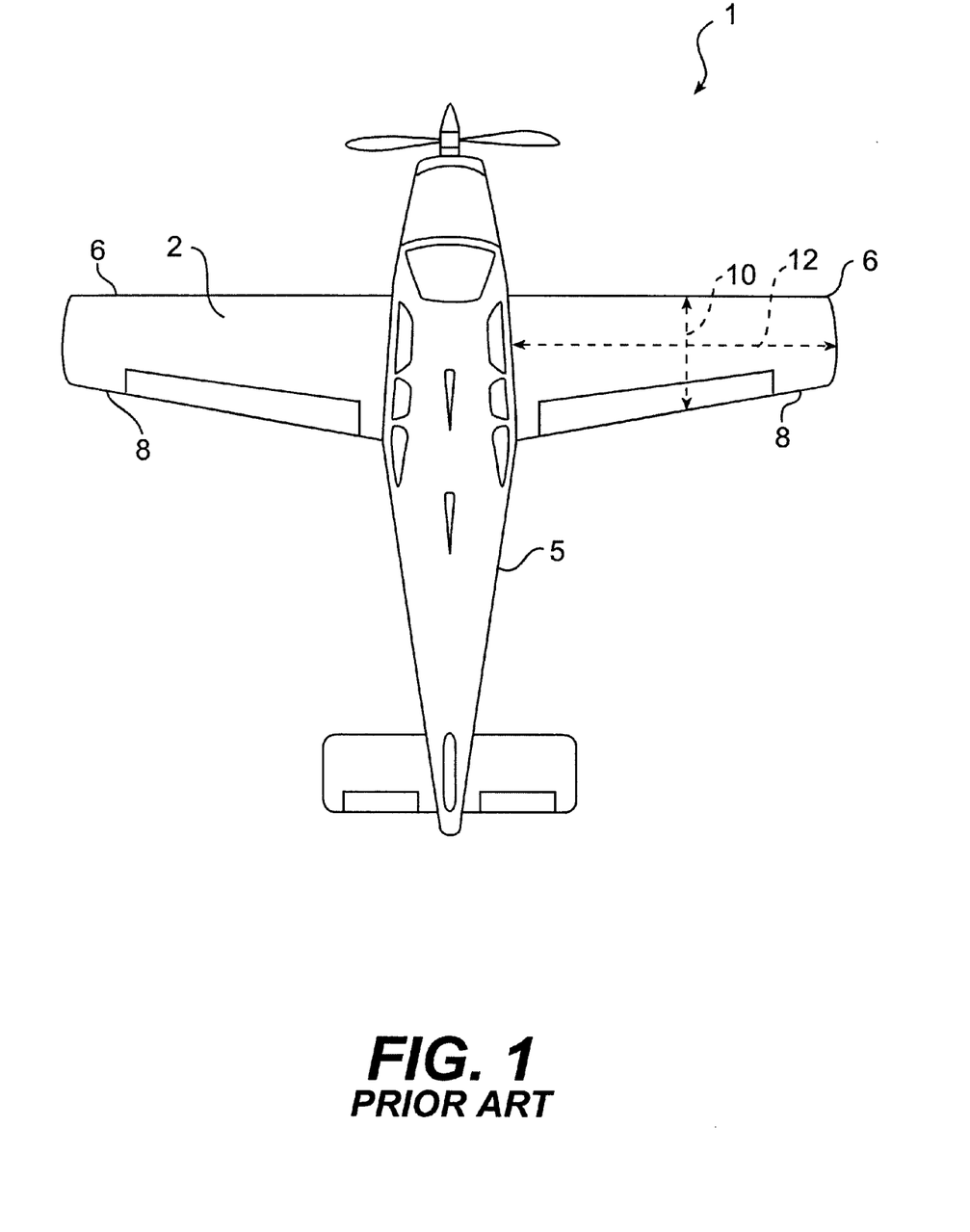
FIG. 1 is a top plan view of a general aviation aircraft.

FIG. 1 shows a typical general aviation aircraft 1. Main wings 2 attach at mid-span to fuselage 5. Each wing has a leading edge 6, a trailing edge 8, a chord line 10 from the leading edge to the trailing edge, and a span line or direction 12. As will be more fully disclosed below, to define the shape of an airfoil the coordinates of the upper and lower surfaces of the airfoil at a plurality of stations along the chord line 10 are given.

Airfoils typically have performance characteristics that are tailored to the range of operating conditions of the aircraft. The airfoil of the present invention was designed with the goal of having low drag coefficients at higher speed conditions experienced by the aircraft and high lift coefficients at lower speed conditions. In addition, the airfoils of the present invention are designed to have the maximum lift coefficient be less sensitive to roughness effects at the leading edge of a wing using the airfoil under conditions of high lift. To achieve roughness insensitivity, the airfoil is shaped to induce the transition from laminar to turbulent flow on the upper surface of the airfoil near the leading edge as the maximum lift coefficient is approached. As a result, a disturbance of airflow across the airfoil induced by foreign material accumulating on the leading edge of the airfoil will not substantially change the already turbulent flow on the upper surface of the airfoil. Consequently, the lift characteristics of the airfoil are not degraded by the presence of foreign material on the leading edge of the airfoil. At less than the maximum lift coefficient, i.e., with the aircraft in a cruise configuration, the flow over the forward portion of the airfoil is laminar and produces low drag coefficients.

Figure 2:
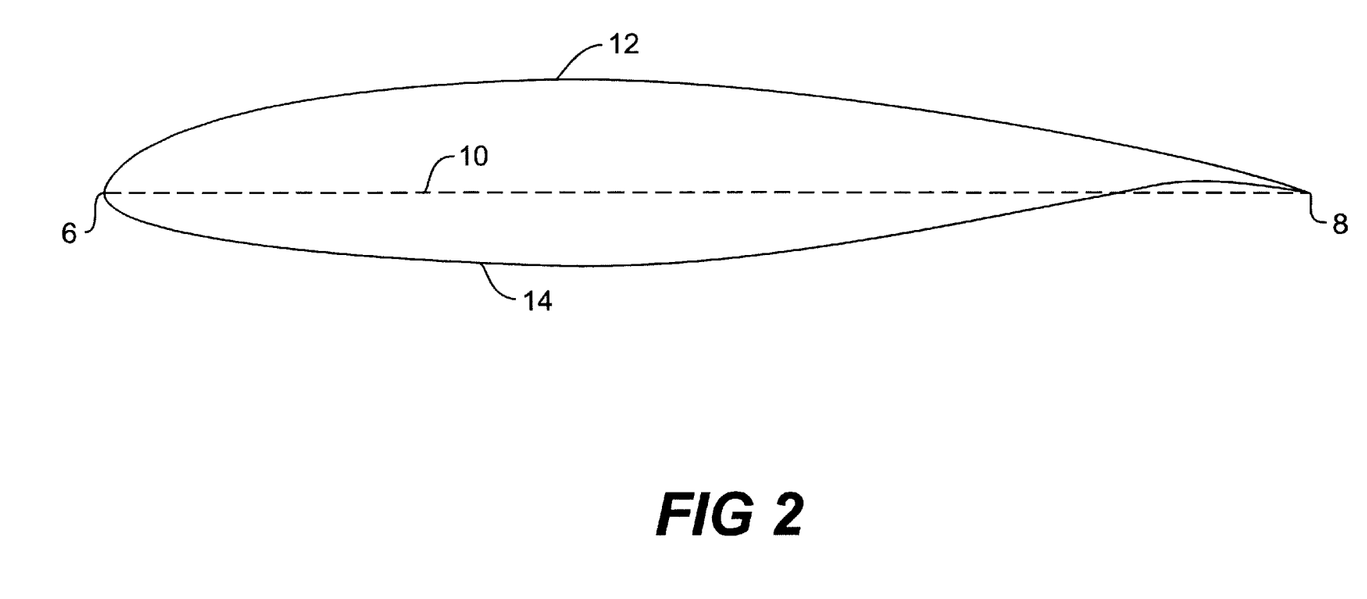
FIG. 2 is a cross-sectional shape of an airfoil in accordance with the invention, with an imaginary line connecting the leading and trailing edges.

FIG. 2 is a shape of an embodiment of the airfoil of the present invention. The upper surface of the airfoil is shown as 12, the lower surface is 14, the leading edge is 6 and the trailing edge is 8. The airfoil has a shape to achieve a maximum lift coefficient of about 1.4 to 1.7 at a Reynolds number of 2,000,000 to 3,000,000, which corresponds to the maximum lift condition of an aircraft using the airfoil at sea level at standard atmospheric conditions with no trailing-edge flap deflection. When used in connection with the maximum lift coefficient, the term "about" means plus or minus 0.1. The measurement of the maximum lift coefficient can vary slightly depending upon the wind tunnel used to make the measurement. When measured in one particular wind tunnel the embodiment of the present invention exhibited a maximum lift coefficient of from 1.46 to 1.53 at a Reynolds number of 2,000,000 to 3,000,000. When tested in other wind tunnels the airfoil exhibited a maximum lift coefficient of from about 1.4 to 1.7 at that same range of Reynolds numbers. The maximum lift coefficient is largely insensitive to roughness effects at the leading edge of the airfoil. The airfoil has a shape to achieve a low profile-drag coefficient over the range of lift coefficients from 0.1 to 0.4 (at Reynolds numbers of 6,000,000 to 9,000,000, which correspond to the cruise condition of an aircraft using the airfoil at sea level at standard atmospheric conditions). The minimum profile-drag coefficient is approximately 0.004. An additional performance characteristic of the present invention is that it has a zero lift pitching-moment coefficient more positive than −0.08. The airfoil has a thickness of 15% of the chord.

The specific shape of the airfoil is given in the form of the following table of coordinates. The x/c values are dimensionless locations on the chord line 10. They are given for both the upper and lower surfaces. The y/c values are the corresponding dimensionless heights from the chord line 10 to points either on the upper or lower surface. The values correspond substantially to the following table for the surfaces in the embodiment having a blunt trailing edge:

| Upper Surface | | Lower Surface | |
|---|---|---|---|
| x/c | y/c | x/c | y/c |
| 0.00001 | 0.00039 | 0.00009 | −0.00147 |
| 0.00017 | 0.00217 | 0.00054 | −0.00308 |
| 0.00357 | 0.01122 | 0.00151 | −0.00454 |
| 0.01117 | 0.02128 | 0.00300 | −0.00600 |
| 0.02281 | 0.03160 | 0.01018 | −0.01065 |
| 0.03845 | 0.04166 | 0.02452 | −0.01660 |
| 0.05803 | 0.05091 | 0.04424 | −0.02243 |
| 0.08181 | 0.05887 | 0.06896 | −0.02811 |
| 0.11019 | 0.06562 | 0.09830 | −0.03357 |
| 0.14297 | 0.07163 | 0.13180 | −0.03876 |
| 0.17954 | 0.07704 | 0.16902 | −0.04357 |
| 0.21937 | 0.08178 | 0.20943 | −0.04791 |
| 0.26191 | 0.08578 | 0.25250 | −0.05166 |
| 0.30662 | 0.08892 | 0.29769 | −0.05467 |
| 0.35296 | 0.09109 | 0.34441 | −0.05678 |
| 0.40037 | 0.09215 | 0.39208 | −0.05776 |
| 0.44828 | 0.09194 | 0.44011 | −0.05736 |
| 0.49614 | 0.09013 | 0.48787 | −0.05495 |
| 0.54379 | 0.08620 | 0.53570 | −0.04955 |
| 0.59159 | 0.08025 | 0.58486 | −0.04152 |
| 0.63946 | 0.07299 | 0.63544 | −0.03252 |
| 0.68678 | 0.06502 | 0.68645 | −0.02371 |
| 0.73290 | 0.05672 | 0.73682 | −0.01572 |
| 0.77715 | 0.04842 | 0.78548 | −0.00900 |
| 0.81885 | 0.04036 | 0.83135 | −0.00377 |
| 0.85732 | 0.03272 | 0.87343 | −0.00018 |
| 0.89191 | 0.02553 | 0.91073 | 0.00180 |
| 0.92409 | 0.01864 | 0.94228 | 0.00238 |
| 0.95097 | 0.01279 | 0.96734 | 0.00199 |
| 0.97222 | 0.00812 | 0.98544 | 0.00115 |
| 0.98759 | 0.00474 | 0.99636 | 0.00034 |
| 0.99689 | 0.00269 | 1.00000 | 0.00000 |
| 1.00000 | 0.00200 | | |

A second embodiment of the invention is an airfoil shape for the main wing of a general aviation aircraft having a sharp trailing edge, as depicted in FIG. 2. The airfoil has an upper surface, a lower surface, and a chord line. In such an airfoil, x/c values are dimensionless locations on the chord line and the y/c values are the corresponding dimensionless distances from the chord line to points on the upper or lower surface. The values correspond substantially to the following table for the surfaces in the embodiment having a sharp trailing edge:

| Upper Surface | | Lower Surface | |
|---|---|---|---|
| x/c | y/c | x/c | y/c |
| 0.00001 | 0.00039 | 0.00009 | −0.00147 |
| 0.00017 | 0.00217 | 0.00054 | −0.00308 |
| 0.00357 | 0.01122 | 0.00151 | −0.00454 |
| 0.01117 | 0.02128 | 0.00300 | −0.00600 |
| 0.02281 | 0.03160 | 0.01018 | −0.01065 |
| 0.03845 | 0.04166 | 0.02452 | −0.01660 |
| 0.05803 | 0.05091 | 0.04424 | −0.02243 |
| 0.08181 | 0.05887 | 0.06896 | −0.02811 |
| 0.11019 | 0.06562 | 0.09830 | −0.03357 |
| 0.14297 | 0.07163 | 0.13180 | −0.03876 |
| 0.17954 | 0.07704 | 0.16902 | −0.04357 |
| 0.21937 | 0.08178 | 0.20943 | −0.04791 |
| 0.26191 | 0.08578 | 0.25250 | −0.05166 |
| 0.30662 | 0.08892 | 0.29769 | −0.05467 |
| 0.35296 | 0.09109 | 0.34441 | −0.05678 |
| 0.40037 | 0.09215 | 0.39208 | −0.05776 |
| 0.44828 | 0.09194 | 0.44011 | −0.05736 |
| 0.49614 | 0.09013 | 0.48787 | −0.05495 |
| 0.54379 | 0.08620 | 0.53570 | −0.04955 |
| 0.59159 | 0.08025 | 0.58486 | −0.04152 |
| 0.63946 | 0.07299 | 0.63544 | −0.03252 |
| 0.68678 | 0.06502 | 0.68645 | −0.02371 |
| 0.73290 | 0.05672 | 0.73682 | −0.01572 |
| 0.77715 | 0.04842 | 0.78548 | −0.00900 |
| 0.81885 | 0.04036 | 0.83135 | −0.00377 |
| 0.85732 | 0.03272 | 0.87343 | −0.00018 |
| 0.89191 | 0.02553 | 0.91073 | 0.00180 |
| 0.92221 | 0.01865 | 0.94228 | 0.00238 |
| 0.94818 | 0.01220 | 0.96734 | 0.00199 |
| 0.96965 | 0.00672 | 0.98544 | 0.00115 |
| 0.98603 | 0.00278 | 0.99636 | 0.00034 |
| 0.99642 | 0.00062 | 1.00000 | 0.00000 |
| 1.00000 | 0.00000 | | |

Figure 3:
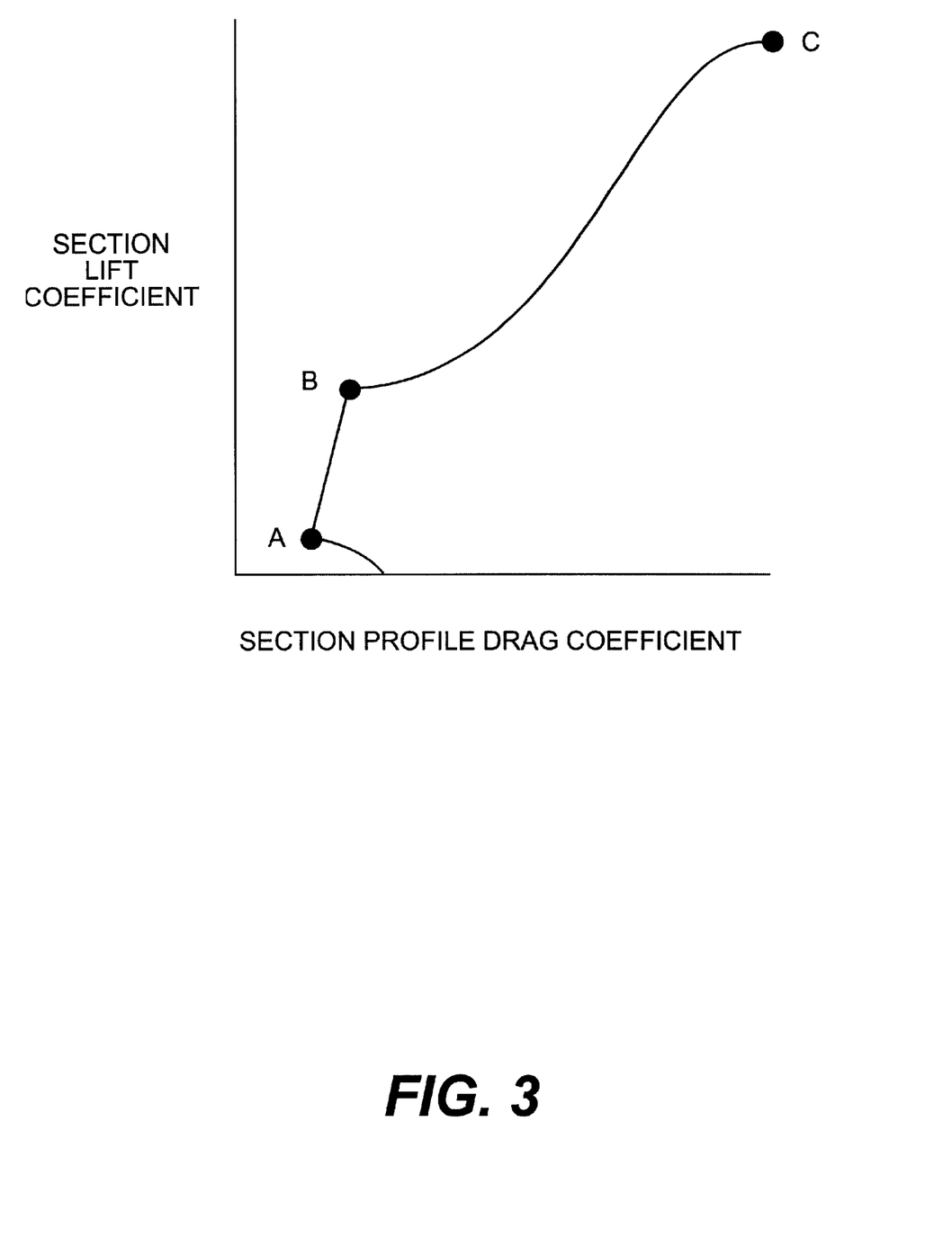
FIG. 3 is a diagram plotting the lift coefficient of an airfoil versus its profile-drag coefficient illustrating the performance goals of the present invention.

FIG. 3 depicts a polar diagram showing the section lift coefficient versus the section profile-drag coefficient of an embodiment of the present invention. Point A in FIG. 3 is the lower limit of the low-drag, lift-coefficient range and the upper limit of the low-drag range is at Point B. The drag of the airfoil increases rapidly outside the low drag range as the boundary-layer transition point moves toward the leading edge of the airfoil with increasing (or decreasing) lift coefficient.

As will be demonstrated in FIGS. 4–9, the leading edge of the airfoil produces a suction peak at higher lift coefficients, which ensures that the transition from laminar to turbulent flow on the upper surface of the airfoil will occur adjacent the leading edge. As a result, the maximum lift coefficient, Point C, occurs with turbulent flow along the entire upper surface of the airfoil leading to insensitivity to roughness at the leading edge.

Figure 4:
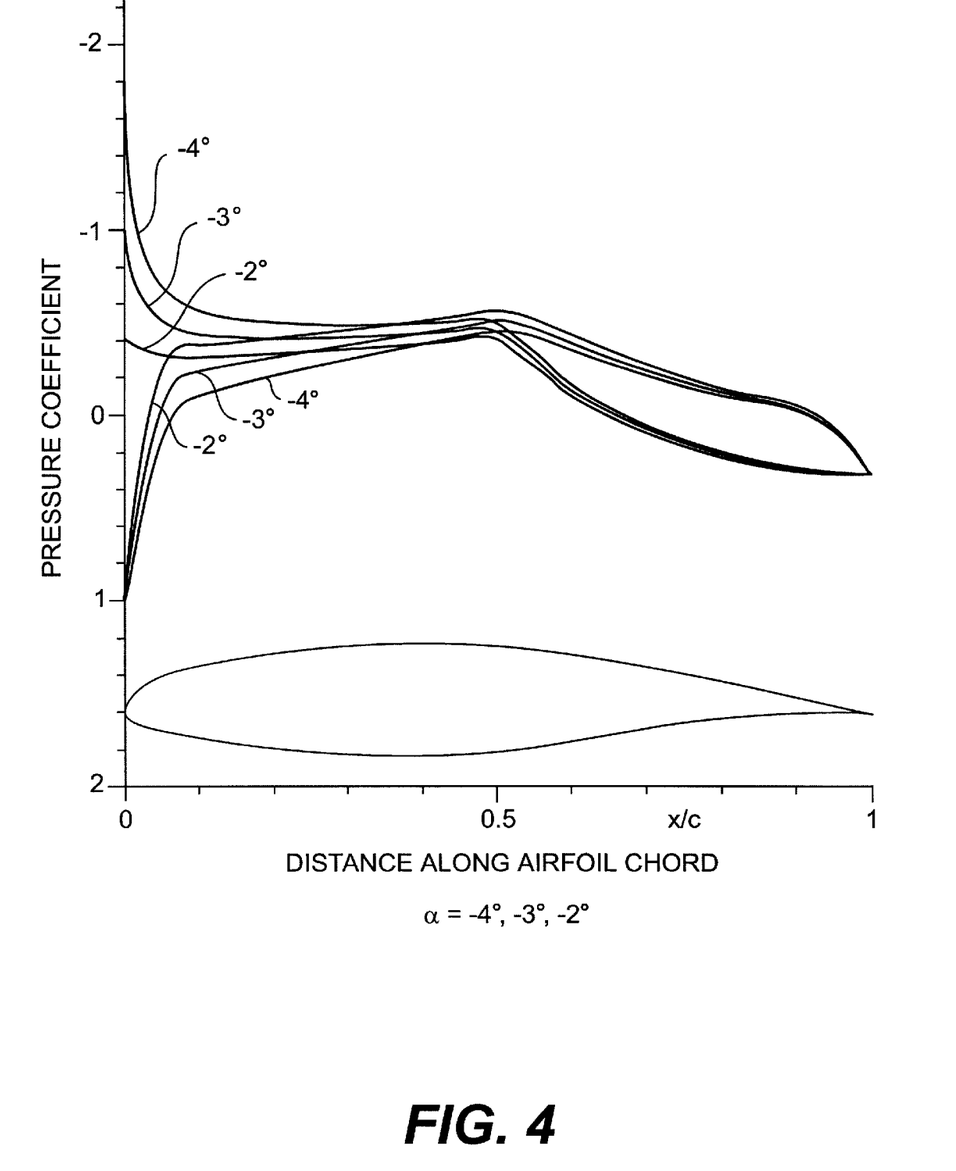
FIG. 4 is a plot of the inviscid pressure coefficient versus the position along the chord of one embodiment of the airfoil of the present invention at three different angles of attack, −4°, −3°, and −2°, relative to the chord line.

FIG. 4 depicts the pressure coefficients at three angles of attack as a function of the distance along the airfoil chord. The pressure distributions in FIG. 4 represent those pressure distributions at various angles of attack near Point A in FIG. 3. In this configuration, the transition from laminar to turbulent flow occurs at approximately 50% chord on both surfaces.

Figure 5:
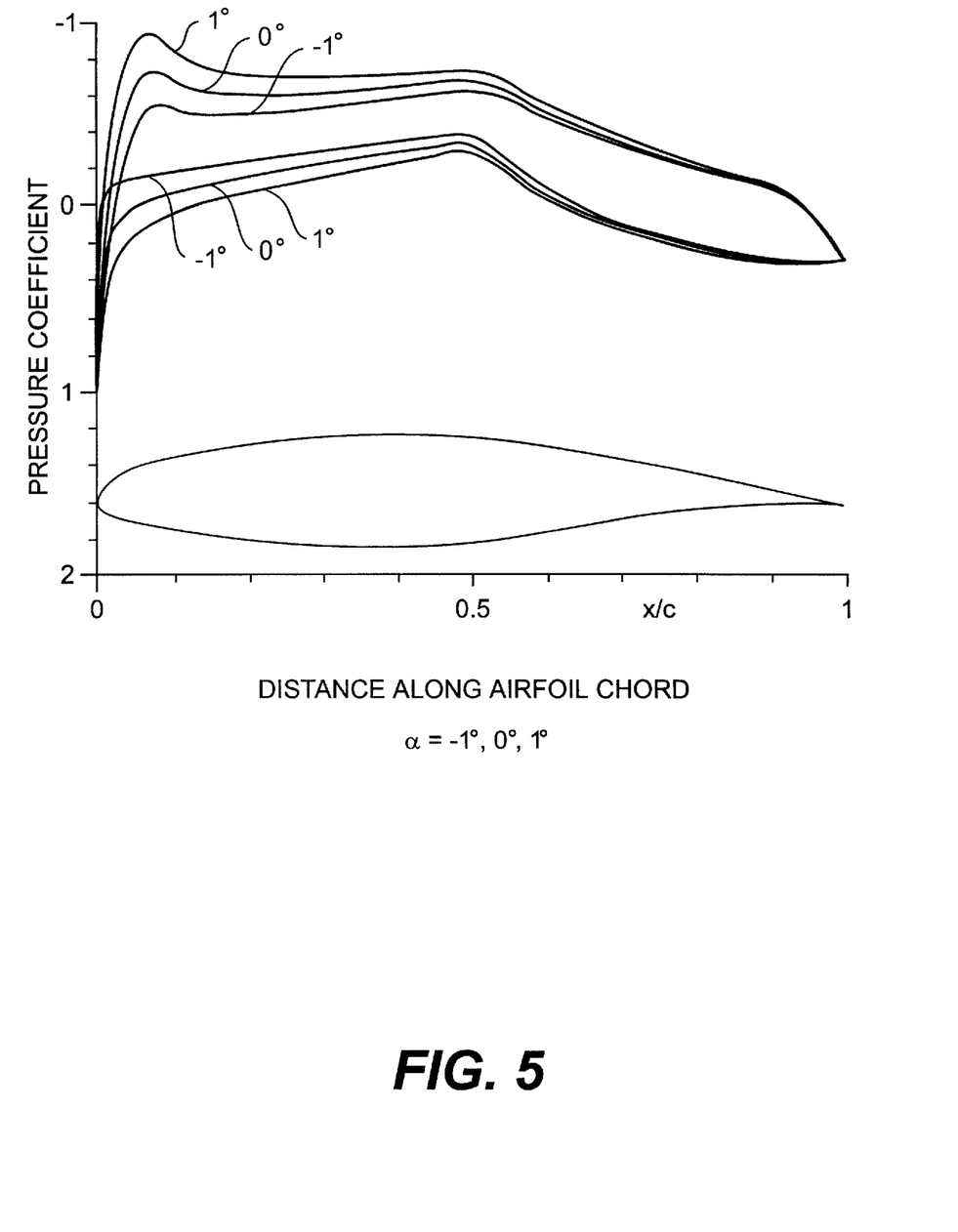
FIG. 5 is a plot of the inviscid pressure coefficient versus the position along the chord of one embodiment of the airfoil of the present invention at three different angles of attack, −1°, 0°, and 1°, relative to the chord line.
Figure 6:
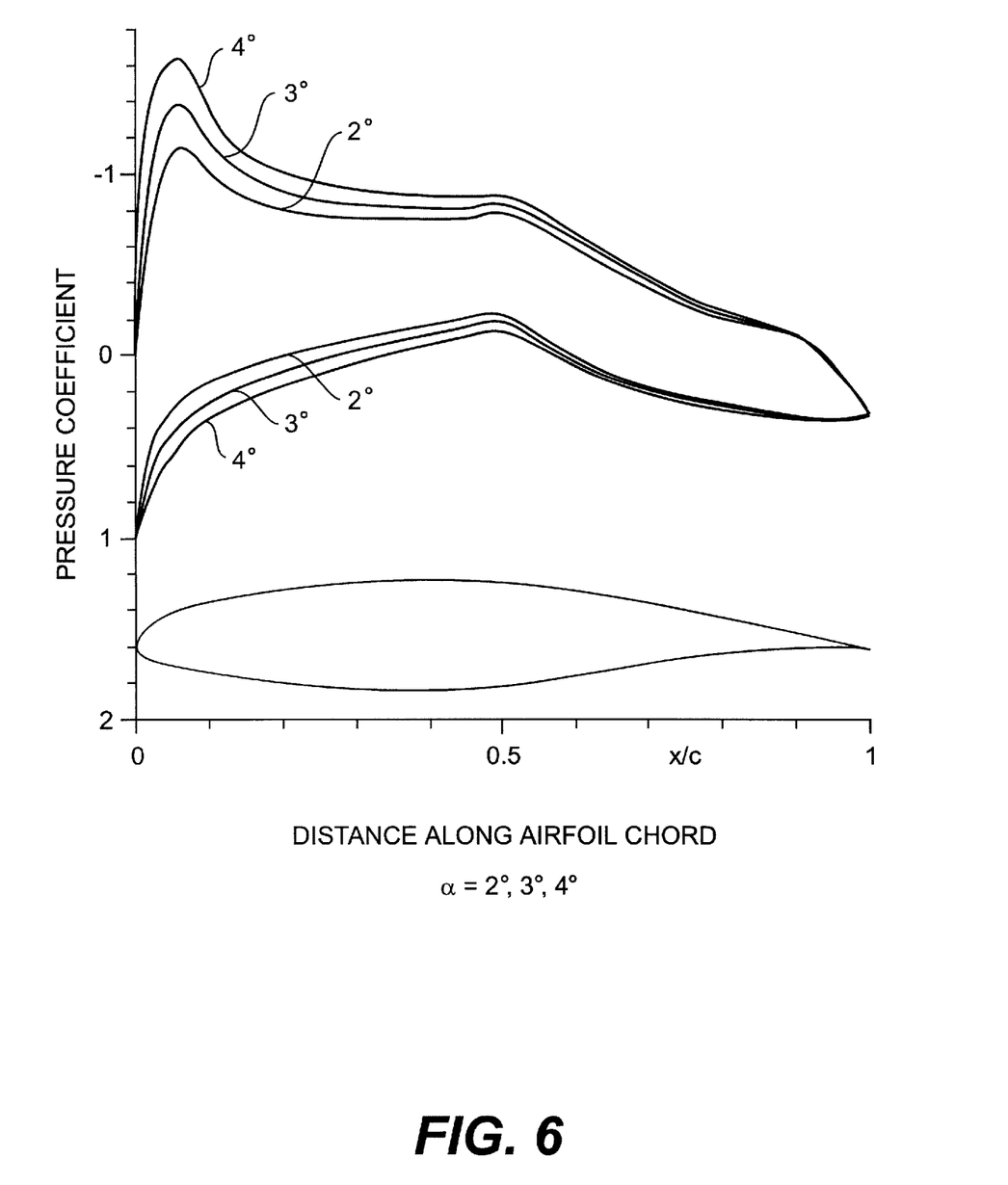
FIG. 6 is a plot of the inviscid pressure coefficient versus the position along the chord of one embodiment of the airfoil of the present invention at three different angles of attack, 2°, 3°, and 4°, relative to the chord line.
Figure 7:
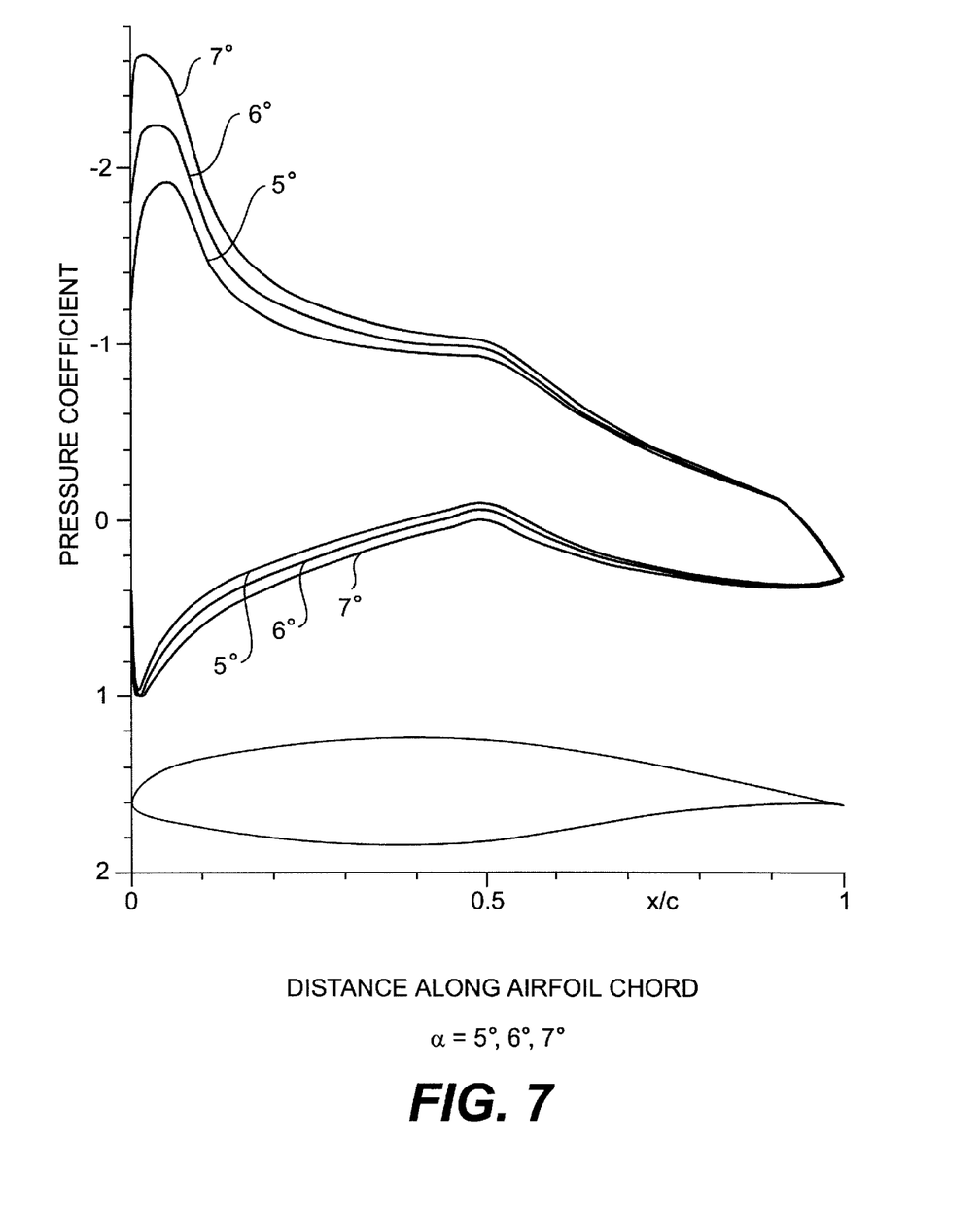
FIG. 7 is a plot of the inviscid pressure coefficient versus the position along the chord of one embodiment of the airfoil of the present invention at three different angles of attack, 5°, 6°, and 7°, relative to the chord line.
Figure 8:
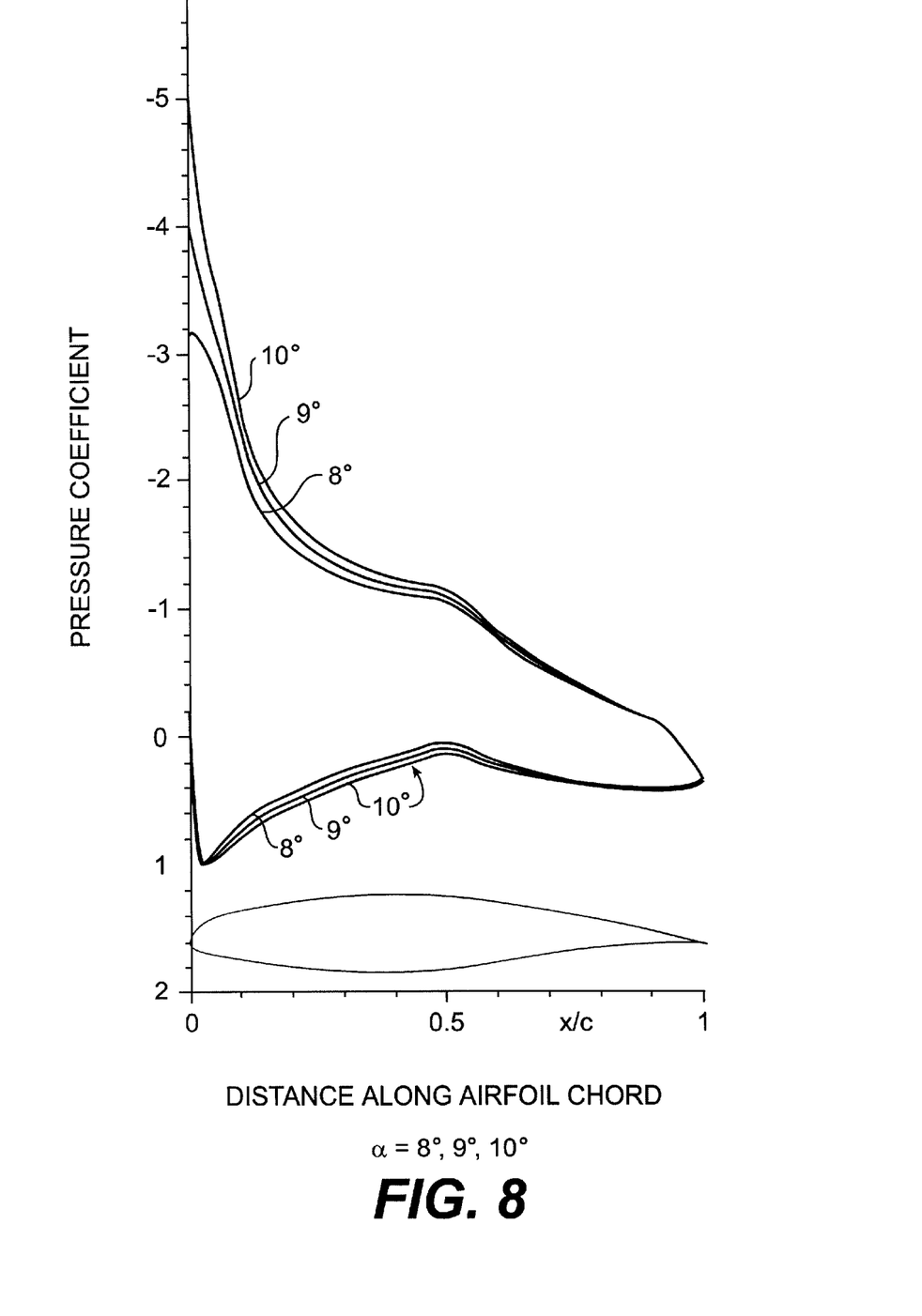
FIG. 8 is a plot of the inviscid pressure coefficient versus the position along the chord of one embodiment of the airfoil of the present invention at three different angles of attack, 8°, 9°, and 10°, relative to the chord line.
Figure 9:
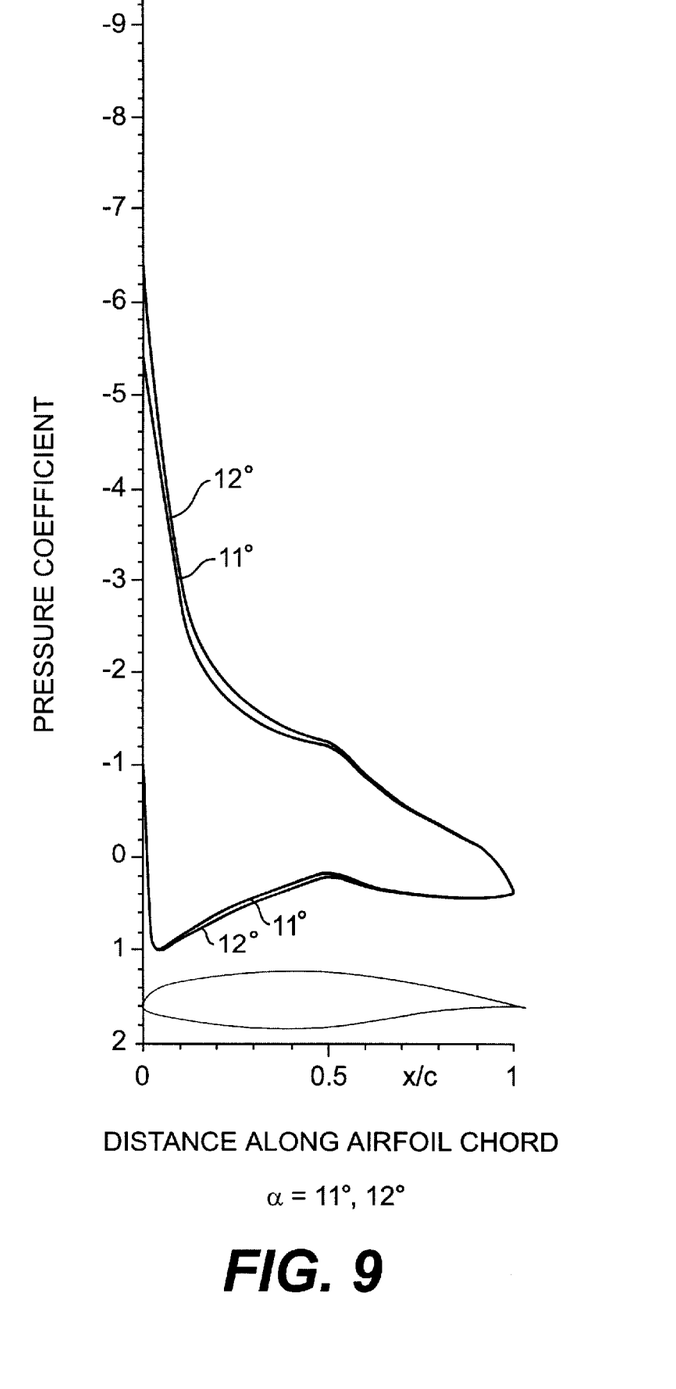
FIG. 9 is a plot of the inviscid pressure coefficient versus the position along the chord of one embodiment of the airfoil of the present invention at two different angles of attack, 11° and 12°, relative to the chord line.

FIG. 5 represents the pressure coefficients along the airfoil chord at approximately Point B on the graph of FIG. 3 at several angles of attack. As is evident from the curves, no spike of negative pressure exists at the leading edge of the airfoil at these angles of attack. A rounded peak occurs aft of the leading edge, which allows higher lift coefficients to be reached without significant flow separation from the upper surface of the airfoil. This also suppresses the leading-edge peak that would otherwise form with increasing trailing-edge flap deflection, thus allowing a higher maximum lift coefficient to be achieved.

As is evident from the pressure curves shown in FIGS. 6, 7, 8 and 9, at higher angles of attack, the peak becomes sharper and moves to the leading edge of the airfoil. This causes the transition from laminar to turbulent flow to move toward the leading edge of the airfoil with increasing lift coefficient, which leads to roughness insensitivity of the maximum lift coefficient.

The present invention can be applied over a range of chords; preferably, each airfoil has a thickness of 15%, a Reynolds number in a range from 1,000,000–9,000,000 and a maximum lift coefficient in a range of about 1.4 to 1.7. The preferred embodiment of the invention is an airfoil used in the wing of a low-speed aircraft. Preferably the wings of such an aircraft range in tip-to-tip span length from 5 to 16 meters.

Although the invention has been shown and described with respect to several preferred embodiments, it should be understood that various changes in the form and detail thereof may be made therein without departing from the spirit and scope of the claimed invention.

What is claimed is:

1. An airfoil having an upper surface, a lower surface, a leading edge, a trailing edge, and a chord line, said airfoil providing primarily turbulent flow across said upper surface of said airfoil at the maximum lift coefficient, said airfoil having lift characteristics substantially insensitive to surface roughness on said leading edge, said airfoil having upper and lower surfaces defined at x/c locations on the chord line and the y/c distances from the chord line to points on the upper or lower surfaces, wherein the x/c locations and y/c distances correspond substantially to the following table:

| Upper Surface | | Lower Surface | |
|---|---|---|---|
| x/c | y/c | x/c | y/c |
| 0.00001 | 0.00039 | 0.00009 | −0.00147 |
| 0.00017 | 0.00217 | 0.00054 | −0.00308 |
| 0.00357 | 0.01122 | 0.00151 | −0.00454 |
| 0.01117 | 0.02128 | 0.00300 | −0.00600 |
| 0.02281 | 0.03160 | 0.01018 | −0.01065 |
| 0.03845 | 0.04166 | 0.02452 | −0.01660 |
| 0.05803 | 0.05091 | 0.04424 | −0.02243 |
| 0.08181 | 0.05887 | 0.06896 | −0.02811 |
| 0.11019 | 0.06562 | 0.09830 | −0.03357 |
| 0.14297 | 0.07163 | 0.13180 | −0.03876 |
| 0.17954 | 0.07704 | 0.16902 | −0.04357 |
| 0.21937 | 0.08178 | 0.20943 | −0.04791 |
| 0.26191 | 0.08578 | 0.25250 | −0.05166 |
| 0.30662 | 0.08892 | 0.29769 | −0.05467 |
| 0.35296 | 0.09109 | 0.34441 | −0.05678 |
| 0.40037 | 0.09215 | 0.39208 | −0.05776 |
| 0.44828 | 0.09194 | 0.44011 | −0.05736 |
| 0.49614 | 0.09013 | 0.48787 | −0.05495 |
| 0.54379 | 0.08620 | 0.53570 | −0.04955 |
| 0.59159 | 0.08025 | 0.58486 | −0.04152 |
| 0.63946 | 0.07299 | 0.63544 | −0.03252 |
| 0.68678 | 0.06502 | 0.68645 | −0.02371 |
| 0.73290 | 0.05672 | 0.73682 | −0.01572 |
| 0.77715 | 0.04842 | 0.78548 | −0.00900 |
| 0.81885 | 0.04036 | 0.83135 | −0.00377 |
| 0.85732 | 0.03272 | 0.87343 | −0.00018 |
| 0.89191 | 0.02553 | 0.91073 | 0.00180 |
| 0.92409 | 0.01864 | 0.94228 | 0.00238 |
| 0.95097 | 0.01279 | 0.96734 | 0.00199 |
| 0.97222 | 0.00812 | 0.98544 | 0.00115 |
| 0.98759 | 0.00474 | 0.99636 | 0.00034 |
| 0.99689 | 0.00269 | 1.00000 | 0.00000 |
| 1.00000 | 0.00200 | | |

2. The airfoil of claim 1, said airfoil having a maximum thickness ratio of 15%.

3. The airfoil of claim 1, said airfoil having a maximum lift coefficient in the range of about 1.4 to 1.7.

4. The airfoil of claim 3, wherein said airfoil has a Reynolds number in the range from 2,000,000 to 3,000,000.

5. The airfoil of claim 1, wherein said airfoil has a Reynolds number in the range from 1,000,000 to 9,000,000.

6. The airfoil of claim 1, said airfoil having a minimum drag coefficient of approximately 0.004.

7. The airfoil of claim 1, wherein said airfoil is a main-wing airfoil of a general aviation aircraft.

8. An airfoil having an upper surface, a lower surface, a leading edge, a trailing edge, and a chord line, said airfoil providing primarily turbulent flow across the upper surface of said airfoil at the maximum lift coefficient, said airfoil having upper and lower surfaces, wherein the x/c locations and y/c distances correspond substantially to the following table:

| Upper Surface | | Lower Surface | |
|---|---|---|---|
| x/c | y/c | x/c | y/c |
| 0.00001 | 0.00039 | 0.00009 | −0.00147 |
| 0.00017 | 0.00217 | 0.00054 | −0.00308 |
| 0.00357 | 0.01122 | 0.00151 | −0.00454 |
| 0.01117 | 0.02128 | 0.00300 | −0.00600 |
| 0.02281 | 0.03160 | 0.01018 | −0.01065 |
| 0.03845 | 0.04166 | 0.02452 | −0.01660 |
| 0.05803 | 0.05091 | 0.04424 | −0.02243 |
| 0.08181 | 0.05887 | 0.06896 | −0.02811 |
| 0.11019 | 0.06562 | 0.09830 | −0.03357 |
| 0.14297 | 0.07163 | 0.13180 | −0.03876 |
| 0.17954 | 0.07704 | 0.16902 | −0.04357 |
| 0.21937 | 0.08178 | 0.20943 | −0.04791 |
| 0.26191 | 0.08578 | 0.25250 | −0.05166 |
| 0.30662 | 0.08892 | 0.29769 | −0.05467 |
| 0.35296 | 0.09109 | 0.34441 | −0.05678 |
| 0.40037 | 0.09215 | 0.39208 | −0.05776 |
| 0.44828 | 0.09194 | 0.44011 | −0.05736 |
| 0.49614 | 0.09013 | 0.48787 | −0.05495 |
| 0.54379 | 0.08620 | 0.53570 | −0.04955 |
| 0.59159 | 0.08025 | 0.58486 | −0.04152 |
| 0.63946 | 0.07299 | 0.63544 | −0.03252 |
| 0.68678 | 0.06502 | 0.68645 | −0.02371 |
| 0.73290 | 0.05672 | 0.73682 | −0.01572 |
| 0.77715 | 0.04842 | 0.78548 | −0.00900 |
| 0.81885 | 0.04036 | 0.83135 | −0.00377 |
| 0.85732 | 0.03272 | 0.87343 | −0.00018 |
| 0.89191 | 0.02553 | 0.91073 | 0.00180 |
| 0.92221 | 0.01865 | 0.94228 | 0.00238 |
| 0.94818 | 0.01220 | 0.96734 | 0.00199 |
| 0.96965 | 0.00672 | 0.98544 | 0.00115 |
| 0.98603 | 0.00278 | 0.99636 | 0.00034 |
| 0.99642 | 0.00062 | 1.00000 | 0.00000 |
| 1.00000 | 0.00000 | | |

9. The airfoil of claim 8, said airfoil having a maximum thickness ratio of 15%.

10. The airfoil of claim 8, said airfoil having a maximum lift coefficient in the range of about 1.4 to 1.7.

11. The airfoil of claim 8, wherein said airfoil has a Reynolds number in the range from 1,000,000 to 9,000,000.

12. The airfoil of claim 8, said airfoil having a Reynolds number in the range from 2,000,000 to 3,000,000 and a maximum lift coefficient in the range of about 1.4 to 1.7.

13. The airfoil of claim 8, said airfoil having a minimum drag coefficient of approximately 0.004.

14. An airfoil for the main wing of a general aviation aircraft, said airfoil comprising an upper surface and a lower surface and having a chord line, wherein x/c values are dimensionless locations on the chord line and the y/c values are dimensionless distances from said chord line to points on said upper or lower surface, wherein said values correspond substantially to the following table for said surfaces:

| Upper Surface | | Lower Surface | |
|---|---|---|---|
| x/c | y/c | x/c | y/c |
| 0.00001 | 0.00039 | 0.00009 | −0.00147 |
| 0.00017 | 0.00217 | 0.00054 | −0.00308 |
| 0.00357 | 0.01122 | 0.00151 | −0.00454 |
| 0.01117 | 0.02128 | 0.00300 | −0.00600 |
| 0.02281 | 0.03160 | 0.01018 | −0.01065 |
| 0.03845 | 0.04166 | 0.02452 | −0.01660 |
| 0.05803 | 0.05091 | 0.04424 | −0.02243 |
| 0.08181 | 0.05887 | 0.06896 | −0.02811 |
| 0.11019 | 0.06562 | 0.09830 | −0.03357 |
| 0.14297 | 0.07163 | 0.13180 | −0.03876 |
| 0.17954 | 0.07704 | 0.16902 | −0.04357 |
| 0.21937 | 0.08178 | 0.20943 | −0.04791 |
| 0.26191 | 0.08578 | 0.25250 | −0.05166 |
| 0.30662 | 0.08892 | 0.29769 | −0.05467 |
| 0.35296 | 0.09109 | 0.34441 | −0.05678 |
| 0.40037 | 0.09215 | 0.39208 | −0.05776 |
| 0.44828 | 0.09194 | 0.44011 | −0.05736 |
| 0.49614 | 0.09013 | 0.48787 | −0.05495 |
| 0.54379 | 0.08620 | 0.53570 | −0.04955 |
| 0.59159 | 0.08025 | 0.58486 | −0.04152 |
| 0.63946 | 0.07299 | 0.63544 | −0.03252 |
| 0.68678 | 0.06502 | 0.68645 | −0.02371 |
| 0.73290 | 0.05672 | 0.73682 | −0.01572 |
| 0.77715 | 0.04842 | 0.78548 | −0.00900 |
| 0.81885 | 0.04036 | 0.83135 | −0.00377 |
| 0.85732 | 0.03272 | 0.87343 | −0.00018 |
| 0.89191 | 0.02553 | 0.91073 | 0.00180 |
| 0.92409 | 0.01864 | 0.94228 | 0.00238 |
| 0.95097 | 0.01279 | 0.96734 | 0.00199 |

-continued

| Upper Surface | | Lower Surface | |
|---|---|---|---|
| x/c | y/c | x/c | y/c |
| 0.97222 | 0.00812 | 0.98544 | 0.00115 |
| 0.98759 | 0.00474 | 0.99636 | 0.00034 |
| 0.99689 | 0.00269 | 1.00000 | 0.00000 |
| 1.00000 | 0.00200 | | |

15. The airfoil of claim 14, said airfoil having a maximum thickness ratio of 15%.

16. The airfoil of claim 14, said airfoil having a maximum lift coefficient in the range from 1.4 to 1.6.

17. The airfoil of claim 16, wherein said airfoil has a Reynolds number in the range from 2,000,000 to 3,000,000.

18. The airfoil of claim 14, wherein said airfoil has a Reynolds number in the range from 1,000,000 to 9,000,000.

19. The airfoil of claim 14, said airfoil having a maximum lift coefficient in the range about 1.4 to 1.7.

20. The airfoil of claim 14, said airfoil having a minimum drag coefficient of approximately 0.004.

21. The airfoil of claim 14, said airfoil having lift characteristics substantially insensitive to surface roughness on said leading edge.

22. The airfoil of claim 14, said airfoil providing primarily turbulent flow across said upper surface of said airfoil at the maximum lift coefficient of said airfoil.

* * * * *